United States Patent Office 3,155,248
Patented Nov. 3, 1964

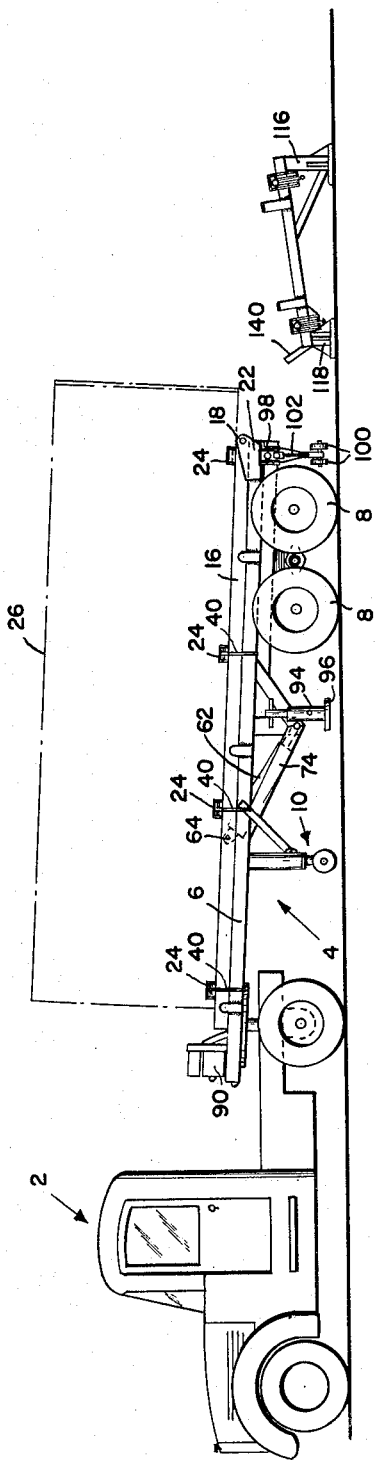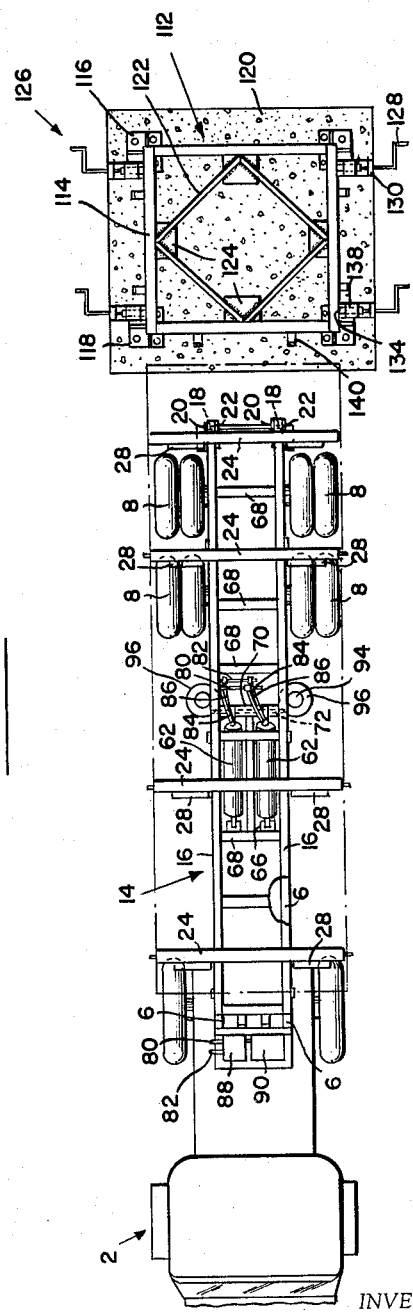

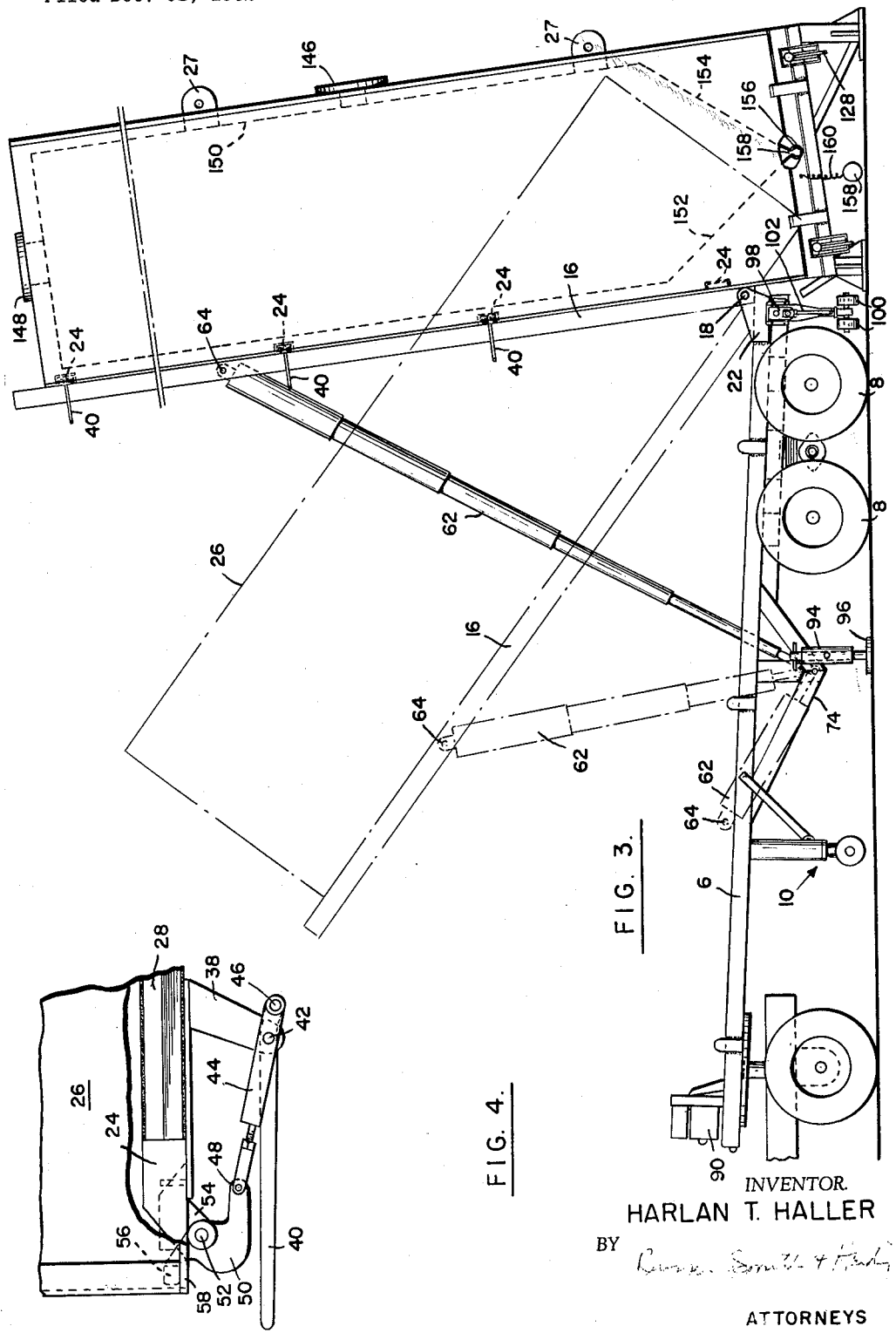

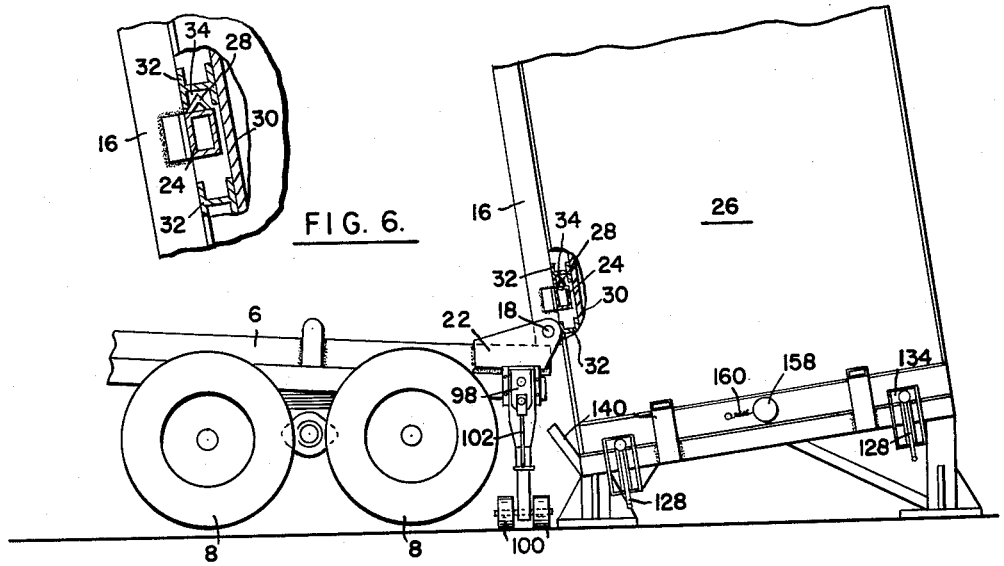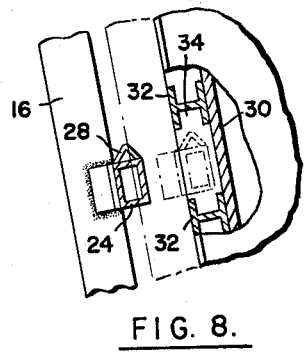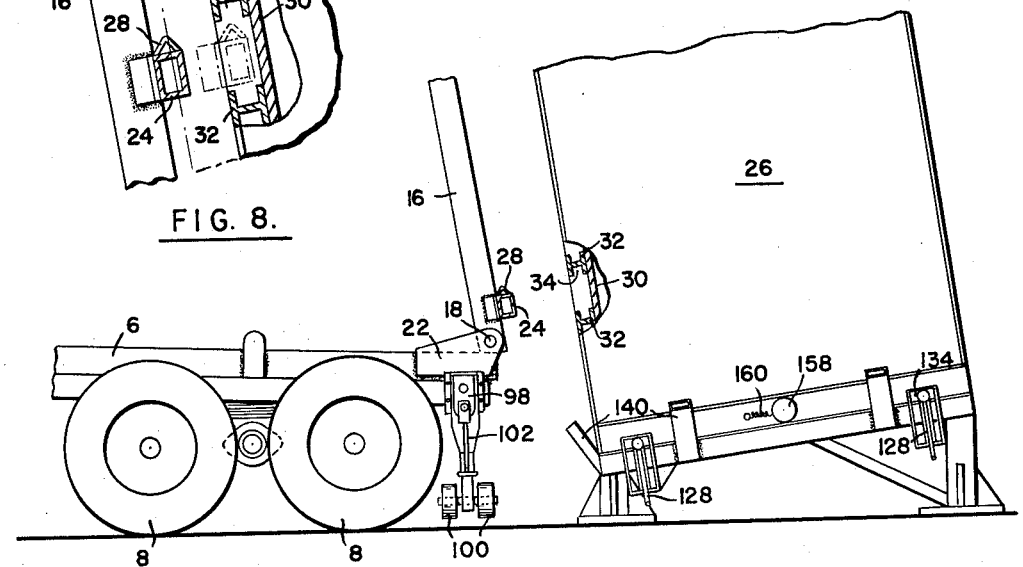

3,155,248
VEHICLE-CONTAINER
Harlan T. Haller, Wyckoff, N.J., assignor to Seatrain Lines, Inc., Edgewater, N.J., a corporation of Delaware
Filed Dec. 31, 1962, Ser. No. 248,787
10 Claims. (Cl. 214—38)

This invention relates to a vehicle-container combination.

The transportation of goods in containers of a size which can be transported on the trailer of a tractor-trailer is becoming of increasing importance, particularly where transportation in part by ship is involved. This invention is particularly advantageous for the transportation of bulk commodities such as, for example, synthetic resin powders, granules or beads and other commodities which are in powdered granular or similar form. However, it will be understood that the invention is of utility for use in the transportation of liquids also.

Heretofore used containers have not been satisfactory for use with particulate matter of relatively small size due to the difficulty of discharging the matter particularly where it has a relatively large angle of repose.

It is one of the principal objects of this invention to provide means including a container and a vehicle whereby bulk commodities can be transported on highways and stored in the container detached from the vehicle.

It is a further object of this invention to provide a vehicle-container combination having means for removing the container from the vehicle to store it on one end thereof and means to pick up the container and reattach it to the vehicle.

These and other objects of the invention will be further clarified on reading the following description in conjunction with the drawings in which:

FIGURE 1 is a side elevation of a vehicle-container combination of the invention with the container shown in the over-the-road position and additionally showing the support for the storage of the container;

FIGURE 2 is a plan view of the vehicle and support shown in FIGURE 1;

FIGURE 3 is a side elevation of the vehicle-container shown in FIGURE 1 showing the container upended and resting on its support with the trailer in a position to be moved away from the container;

FIGURE 4 is a view partially broken away showing a clamp employed to secure the container to the frame supporting it;

FIGURE 5 is a side elevation of the trailer of FIGURE 1 partially broken away and showing the container just as it has been lowered into contact with its support;

FIGURE 6 is an enlarged view of the detachable connection between the trailer and the container shown in the position it occupies when the parts are as shown in FIGURE 5;

FIGURE 7 is a side elevation of the trailer of FIGURE 1, the container and its support showing the trailer separated from the container; and FIGURE 8 is an enlarged view showing the detachable connection between the trailer and container after the trailer has been separated from the container.

Referring now to FIGURES 1 and 2, a tractor 2 is attached to a rear wheeled trailer 4 having a frame 6 spring mounted on wheel 8. A wheeled support 10 is secured to frame 6 to support the front end thereof when the trailer is detached from the tractor 2. As thus far described, the tractor 2 and trailer 4 are conventional and hence need not be described in any greater detail.

A pivotal frame 14 has longitudinal support members 16, each of which is pivotally connected to a rod 18 secured in upright support members 20 and 22 which are secured to frame 6.

A plurality of transverse support members 24 are secured to the longitudinal support members 16, 16 for example, by welding, and are adapted to support transversely a container 26. Each member 24 is provided with a pair of forwardly facing (as viewed in FIGURE 2) wedge-shaped members 28. Transverse I beams 32 supporting bottom 30 of container 26 (see FIGURE 6) are adapted to rest on longitudinal members 16. One I beam 32 lies adjacent each transverse member 24 so that the wedge-shaped members 28 can enter the adjacent grooves 34 formed by the I beams.

In order to secure container 26 to frame 14 for over-the-road travel, each end of each transverse member 24 has secured thereto a bracket 38 (see FIGURE 4) to which a lever 40 is pivotally secured at 42. A link 44 adjustable in length is pivoted at 46 to lever 40 and at 48 to a bell crank 50. Bell crank 50 is pivotally secured at 52 to a bracket 54 secured to transverse member 24. Bell crank 50 has a clamping end 56 which in the position shown in FIGURE 4 is clamped down against flange 58 which extends along each side of container 26.

Referring now to FIGURES 1 through 3, a pair of telescoping hydraulic rams 62, 62 are provided for the upward pivoting of frame 14. Each telescoping ram is pivotally secured to a U-shaped bracket 66 welded to one of brace members 68, the said brace members being welded at either end to longitudinal members 16, 16. The other end of each ram 62 is secured to a sleeve 70 rotatably mounted on rod 72 which is secured at either end to a V-brace 74 (FIGURE 1) having its end in turn secured to the adjacent frame 16. It is to be noted that the point at which each ram 62 is connected to pivotal frame 14 is well forward of the point at which the other end of the ram is pivoted to provide as much mechanical advantage as possible.

Rams 62 are connected to hydraulic supply exhaust lines 80 and 82 by lines 84, 84, and 86, 86, respectively. Lines 80 and 82 are connected to a pump-reservoir indicated at 88, the pump being driven by a gasoline motor indicated at 90. Other types of motors such as an electric motor can obviously be employed. Since telescoping hydraulic rams and their operation are well-known to the art, a detailed description of the operation of rams 62 is not necessary.

A screw jack 94 is secured to each brace 74 to provide support for the braces 74, 74 when the rams 62 are being operated at which time the foot 96 of each jack is screwed down onto the supporting roadway as shown in FIGURE 3.

The rear end of frame 6 has secured thereto a pair of screw jacks 98, 98 provided with road engaging wheels 100 and operated by a crank handle 102. Screw jacks 98 are of a conventional type employed with trailers in order to support the front ends thereof when not attached to the tractor.

Referring particularly to FIGURES 1 and 2, there is shown to the rear end of the trailer a container support 112 having a rectangular supporting frame 114 disposed at an angle to the horizontal of about 11°. Advantageously, this angle will be in the range of from 4° to 15°, but need not necessarily be in this range, it being satisfactory, for example, to have frame 114 lying in a horizontal plane. Frame 114 is supported by the relatively high legs 116, 116 and the relatively low legs 118, 118 which in turn are supported on a concrete pad 120. A rectangular frame 122 acts to brace frame 114 and is welded thereto at its corner. Plates 124 are welded to both frames 114 and 122. Clamps 126 (see FIGURE 2) secured to frame 114 are each provided with a crank 128 which is threaded to bracket 130. A clamping member 134 for engagement of the side of the container is pivotally connected to a crank 128 and 136 to provide for the rotation of cranks 130 independently of clamping member 134 which slides horizontally within sleeve 138. Upstanding guide members 140 are placed about the periphery of frame 114.

Referring particularly to FIGURE 3, container 26 is provided with a hatch 146 for loading the container when it is in the horizontal position and a hatch 148 for loading it when it is in the upended position shown in FIGURE 3. The interior wall 150 of container 26 presents advantageously a smooth uninterrupted surface. At the lower end of the container in the position shown in FIGURE 3, wall 150 has sloping portions 152 and 154 which lead downwardly to a pipe 156 running the width of the container and having an opening 158 running the width of the container to permit the contents of the container to run into pipe 156. The angles at which sloping portions 152 and 154 lie with respect to the horizontal will be selected so as to be substantially greater than the angle of repose of the material to be shipped in the container. Pipe 156 extends through the wall of container 26 which is closest to the viewer in FIGURE 3 and is closed off by means of a screw cap 158 attached by a chain 160 to the container 26.

*Operation*

The container can either be loaded before or after it is placed on trailer 4, the loading normally being carried out with the container in a substantially horizontal position through hatch 146. Assuming, for example, that the container 26 is loaded with, for example, resin particles and is resting substantially horizontally on the deck of a ship, it can be removed by the engagement of a sling with padeyes 27 secured to opposite sides of the top of container 26, the sling being secured to, for example, a gantry crane. When removed from the ship by the crane, the container 26 is placed on pivotal frame 14 of trailer 4 with transverse members 24 lying adjacent I beams 32 on the bottom of container 26. The container is then moved slightly rearwardly by the crane until projection members 26 are nested in the adjacent grooves 34 in I beams 32. The lower portion of levers 40 are then moved inwardly to clamp clamp member 56 against adjacent flange 58 of container 26 to secure container 26 tightly to pivotal frame 14.

Trailer 4 and container 26 are then towed by tractor 2 to the desired delivery site having a support 112 for container 26. The trailer 4 is then positioned as shown in FIGURE 1 with the rear end thereof adjacent support 112. Jacks 94 are now operated to lower feet 96 onto the roadway to provide additional support during the initial extension of rams 62 which are now actuated to pivot pivotal frame 14 upwardly to a position in the vicinity of that shown in phantom in FIGURE 3. If at this stage it appears that the now lower end of container 26 is not perfectly positioned with respect to support 112, jacks 94 are raised clear of the roadway and additional adjustments are made by the operation of tractor 2. When the relative position of container 26 with respect to support 112 is satisfactory, jacks 98 are operated by crank handles 102 to lower wheels 100 to the roadway and then elevate the rear wheels 8 of trailer 4 off the roadway to elevate the pivotal connection between trailer 4 and pivotal frame 14 and hence the now lower end of box 26 so that it will be above frame 114 when frame 14 is fully elevated. The rams 62 are now again actuated to further elevate frame 14 until the lower end of container 26 is in a plane approximately parallel to the plane of frame 114. As best seen in FIGURES 5 and 6, container 26 is being securely held to pivotal frame 14 by the interaction of projection member 28 with I beams 32. Jacks 98 are now actuated to lower the rear end of trailer 4 and to hence lower container 26 until its lower end is supported on frame 114 of support 112. At this stage, the rear wheels 8 of trailer 4 are still elevated above the roadway. Further operation of jacks 98 to lower the rear end of trailer 4 causes the withdrawal of projection members 28 from grooves 34 in I beams 32 (see FIGURES 6 and 7). The jack wheels 100 are now raised above the roadway and trailer 4 can be moved forward to carry pivotal frame 14 clear of container 26. The rams 62 are now operated to return pivotal frame 14 back to its original position resting on longitudinal frame member 6.

The windlock cranks 128 are actuated to cause clamp members 134 to tightly engage opposed sides of box 26.

The contents of container 26 can now be removed by first removing cap 158 from pipe 156 and then attaching a suitable suction hose to pipe 156.

While it is advantageous to have an angle support for container 26 similar to support 112, it will be appreciated that the invention is also fully operative with an ordinary horizontal support, such as, for example, a loading platform. The major criterion with respect to the support is that it provide for supporting the box with the trailer wheels jacked slightly above the roadway in order that the rear end of the trailer can be lowered to disengage the projection members 28 from grooves 34 in I beams 32.

It will be appreciated that the above procedure is simply reversed when it is desired to pick up a container 26 and place it on trailer 4 for over-the-road transportation.

It is not desired to be limited except as set forth in the following claims, the above specific embodiment being by way of illustration only.

What is claimed is:

1. In combination a vehicle having a frame, a pivotal frame adapted to overlie the first-mentioned frame, means pivotally connecting the rear of the pivotal frame to the rear of the first-mentioned frame, a container adapted to overlie the pivotal frame for travelling on the vehicle, a forwardly extending projection member secured to the pivotal frame, means attached to the container having an opening for the reception of said projection member, means to pivot the pivotal frame to upend the container with its lower end clear of the rear of the vehicle and means to elevate and lower the pivotal connecting means whereby the pivotal connecting means is elevated by the fourth mentioned means and the pivotal frame is pivoted by the third mentioned means to position the lower end of the container over a support and the pivotal connecting means is then lowered to first rest the lower end of the container on the support and then lower the projection member clear of the opening of the container, the container having a discharge opening adjacent the thus supported end.

2. The combination in accordance with claim 1 in which the elevating and lowering means comprises a jack.

3. The combination in accordance with claim 1 in which the means to pivot the pivotal frame comprises a hydraulic ram.

4. In combination a vehicle having a frame, a pivotal frame adapted to overlie the first-mentioned frame, means pivotally connecting the rear of the pivotal frame to the rear of the first-mentioned frame, a container adapted to overlie the pivotal frame for travelling on the vehicle, a forwardly extending projection member secured to the pivotal frame and extending transversely thereof, said container having a grooved portion for the reception of said projection member, a support providing a supporting surface for the lower end of the container, means to pivot the pivotal frame to upend the container with its lower end clear of the rear of the vehicle and means to elevate and lower the pivotal connecting means whereby the pivotal connecting means is elevated by the third mentioned means and the pivotal frame is pivoted by the second mentioned means to position the lower end of the container over a support and the pivotal connecting means is then lowered to first rest the lower end of the container on the support and then lower the projection member clear of the opening of the container, the container having a discharge opening adjacent the thus supported end.

5. The combination in accordance with claim 4 in which the elevating and lowering means comprises a jack.

6. The combination in accordance with claim 4 in which the means to pivot the pivotal frame comprises a hydraulic ram.

7. In combination, a vehicle having a frame, a pivotal frame, means pivotally connecting the rear of the pivotal frame to the rear of the first mentioned frame, a container, means releasably securing the container to the pivotal frame, means to pivot the pivotal frame to upend the container with its lower end clear of the rear of the vehicle and means to elevate and lower the pivotal connecting means; whereby the pivotal connecting means is elevated by the fourth mentioned means and the pivotal frame is pivoted by the third mentioned means to position the then lower end of the container over a support and the pivotal connecting means is then lowered to rest the said lower end of the container on the support and release the container from the pivotal frame.

8. In combination, a vehicle having a frame, a pivotal frame, means pivotally connecting the rear of the pivotal frame to the rear of the first mentioned frame, a container, means releasably securing the container to the pivotal frame, a support, means to pivot the pivotal frame to upend the contained with its lower end clear of the rear of the vehicle and means to elevate and lower the pivotal connecting means; whereby the pivotal connecting means is elevated by the fourth mentioned means and the pivotal frame is pivoted by the third mentioned means to position the then lower end of the container over the support and the pivotal connecting means is then lowered to rest the said lower end of the container on the support and release the container from the pivotal frame.

9. In combination, a vehicle having a frame, a pivotal frame, means pivotally connecting the rear of the pivotal frame to the rear of the first mentioned frame, a container, means releasably securing the container to the pivotal frame, means to pivot the pivotal frame to upend the container with its lower end clear of the rear of the vehicle and means to elevate and lower the rear end of the first-mentioned frame; whereby the pivotal connecting means is elevated by the fourth mentioned means and the pivotal frame is pivoted by the third mentioned means to position the lower end of the container over a support and the first mentioned frame is then lowered to lower the pivotal connecting means and rest the said lower end of the container on the support and release the container from the pivotal frame.

10. In combination, a vehicle having a frame, a pivotal frame adapted to overlie the first mentioned frame, means pivotally connecting the rear of the pivotal frame to the rear of the first mentioned frame, a container adapted to overlie the pivotal frame for travelling on the vehicle, a forwardly extending projection member secured to the pivotal frame, means attached to the container having an opening for the reception of said projection member, means to pivot the pivotal frame to upend the container with its lower end clear of the frame of the vehicle and means to elevate and lower the rear end of the first mentioned frame; whereby the pivotal connecting means is elevated and the pivotal frame is pivoted to position the lower end of the container over a support and the pivotal connecting means is then lowered to first rest the lower end of the container on the support and then lower the projection member clear of the said opening, the container having a discharge opening adjacent the thus supported end.

References Cited in the file of this patent
UNITED STATES PATENTS

| | | |
|---|---|---|
| 2,606,673 | Young | Aug. 12, 1952 |
| 2,800,233 | Jones | July 23, 1957 |
| 2,981,152 | Miller et al. | Apr. 25, 1961 |